Patented Sept. 10, 1929.

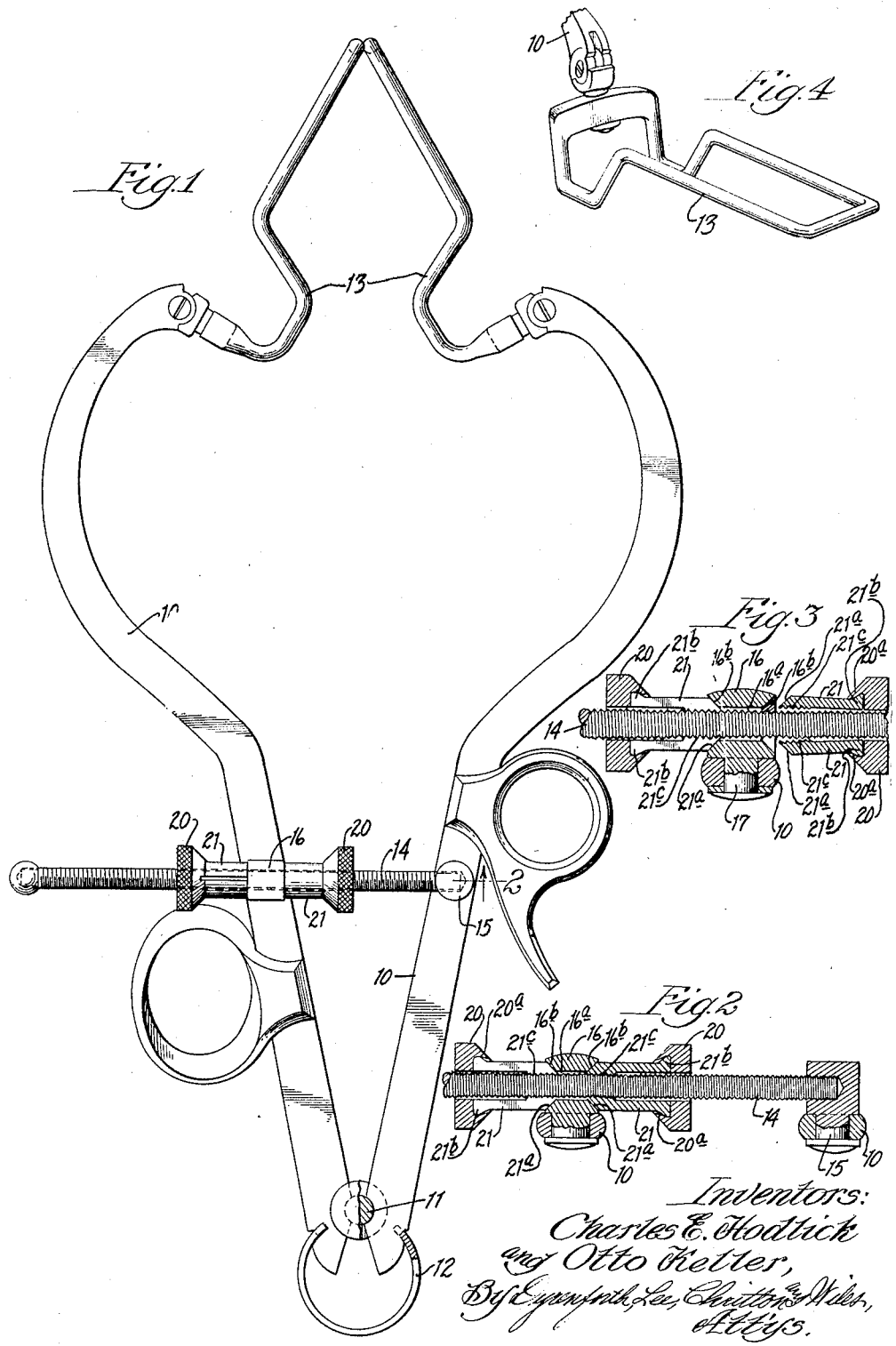

1,727,879

UNITED STATES PATENT OFFICE.

CHARLES E. HODLICK AND OTTO KELLER, OF CHICAGO, ILLINOIS, ASSIGNORS TO SHARP & SMITH, INC., OF CHICAGO, ILLINOIS, A CORPORATION OF ILLINOIS.

RETRACTOR.

Application filed March 25, 1929. Serial No. 349,780.

This invention relates to improvements in retractors and is here shown, for example, as embodied in a retractor especially adapted for bladder operations.

One of the features of our invention is the provision of a spring-pressed retractor that can be very easily and quickly adjusted and also firmly and securely set in any desired position. Means are provided for giving the retractor, very quickly, either coarse or fine close adjustments.

Other features and advantages of our invention will appear more fully as we proceed with our specification.

In that form of device embodying the features of our invention shown in the accompanying drawings—

Figure 1 is a plan view; Fig. 2 is an enlarged view taken as indicated by the line 2 of Fig. 1; Fig. 3 is a similar view showing the nuts in different positions; and Fig. 4 is a view in perspective of the end of one of the jaws of the retractor.

As shown in the drawings, the retractor includes the two jaws 10, 10, pivoted at 11. Numeral 12 indicates a spring urging the jaws apart. The ends of the jaws may be equipped with any desired hooks or members, here shown as the pivoted wire-retaining hooks 13, 13.

Numeral 14 indicates a threaded rod pivotally attached to one jaw 10, as indicated by 15. The other jaw is provided with a block 16 pivotally attached thereto, as indicated by 17. The block 16 is provided with a hole $16^a$ through which the threaded rod is free to slide and the edges of the hole at both ends are beveled, as indicated by $16^b$.

The threaded rod 14 is provided with a loose nut on each side of the block 16. Since these loose nuts are similar, only one need be described in detail. Each nut includes a milled finger part 20 holding the outer ends of two members 21 having their inner ends separable and interiorly threaded, as indicated by $21^c$. The inner ends of these members are also beveled on the outside, as indicated by $21^a$, said beveled portions adapted to be engaged by the beveled edge of the hole $16^a$ when the nut is pushed against the block. The outer ends of the members 21 are slightly enlarged, as indicated by $21^b$, said enlargements being secured under an inwardly turned flange $20^a$ on the part 20. The parts 21 are held by the part 20 so that their inner threaded ends are separable and may be moved away from the threads on the rod, permitting the entire nut to slide on the rod, or moved toward it to bring such ends into threaded engagement with the rod. Although the inner ends of the parts 21 may be separated enough to permit the nut to slide on the rod, they are always held close enough together so that when the nut is pushed against the block 16, the bevels on these ends will engage the beveled edge of the hole in the block, thus forcing the ends toward the rod to bring the threads on the inner surface thereof into threaded engagement with the rod. No relative rotary movement between the member 20 and the members 21 is permitted.

In operation, either nut may be slid on the rod 14 until it engages the block, when it will be thrown into threaded engagement with the rod 14 and said rod held against movement in one direction, except as the nut is screwed on the rod. Both nuts are shown in threaded engagement with the rod in Fig. 2 and the rod is firmly held and can be released only by unscrewing one of the nuts. As soon as one of the nuts is unscrewed away from the block, the parts 21 may be separated, thus permitting the nut to slide on the rod and afford a quick adjustment of the retractor.

While we have shown and described certain embodiments of our invention, it is to be understood that it is capable of many modifications. Changes, therefore, in the construction and arrangement may be made without departing from the spirit and scope of the invention as disclosed in the appended claims, in which it is our intention to claim all novelty inherent in our invention as broadly as possible, in view of the prior art.

What we regard as new, and desire to secure by Letters Patent, is:

1. A retractor including; two pivoted jaws; a threaded rod pivotally attached to one jaw; a block pivotally attached to the other jaw and provided with a hole, the threaded rod slidably extending through said hole, the edge of said hole at one end being beveled; and a loose nut on the threaded rod having separable interiorly threaded members with their ends beveled, said beveled ends adapted to be forced toward the rod into threaded engagement therewith when pushed against the beveled edge of the hole in the block.

2. A retractor including; two pivoted jaws; a threaded rod pivotally attached to one jaw; a block pivotally attached to the other jaw and provided with a hole, the threaded rod slidably extending through said hole, the edges of said hole at both ends being beveled; and a loose nut on the threaded rod at each side of the block, each nut having separable interiorly threaded members with their ends beveled, said beveled ends adapted to be forced toward the rod into threaded engagement therewith when pushed against the beveled edge of the hole in the block.

In witness whereof, we have hereunto set our hands this 23rd day of March, 1929.

CHARLES E. HODLICK.
OTTO KELLER.